United States Patent
Brignull et al.

(10) Patent No.: US 8,271,330 B2
(45) Date of Patent: Sep. 18, 2012

(54) SYSTEM AND METHOD FOR RESEARCHING VIRTUAL MARKETS AND OPTIMIZING PRODUCT PLACEMENTS AND DISPLAYS

(75) Inventors: Michele P. Brignull, Essex Junction, VT (US); Rick A. Hamilton, II, Charlottesville, VA (US); Anne R. Sand, Peyton, CO (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 957 days.

(21) Appl. No.: 12/328,405

(22) Filed: Dec. 4, 2008

(65) Prior Publication Data

US 2010/0145790 A1    Jun. 10, 2010

(51) Int. Cl.
G06Q 30/00    (2012.01)

(52) U.S. Cl. .................. 705/14.53; 705/14.52; 715/706; 725/42

(58) Field of Classification Search ............... 705/14.52, 705/14.53
See application file for complete search history.

(56) References Cited

U.S. PATENT DOCUMENTS

| | | | |
|---|---|---|---|
| 5,842,199 A | 11/1998 | Miller et al. | |
| 6,026,376 A | 2/2000 | Kenney | |
| 6,313,745 B1 | 11/2001 | Suzuki | |
| 6,381,583 B1 | 4/2002 | Kenney | |
| 6,604,239 B1 | 8/2003 | Kohen | |
| 8,069,168 B2 * | 11/2011 | Fitzpatrick et al. | 707/732 |
| 2002/0161651 A1 | 10/2002 | Godsey et al. | |
| 2002/0169665 A1 | 11/2002 | Hughes et al. | |
| 2005/0179685 A1 * | 8/2005 | Kake et al. | 345/419 |
| 2005/0216346 A1 * | 9/2005 | Kusumoto et al. | 705/14 |
| 2005/0251461 A1 | 11/2005 | Nykamp | |
| 2005/0251462 A1 | 11/2005 | Nykamp | |
| 2006/0111189 A1 | 5/2006 | Winkler | |
| 2006/0155615 A1 * | 7/2006 | Loo et al. | 705/27 |
| 2006/0230141 A1 | 10/2006 | Willis | |
| 2007/0055563 A1 | 3/2007 | Godsey et al. | |
| 2007/0067220 A1 | 3/2007 | Godsey et al. | |
| 2007/0067222 A1 | 3/2007 | Godsey et al. | |
| 2007/0129956 A1 | 6/2007 | Stinski | |
| 2007/0260520 A1 | 11/2007 | Jha et al. | |
| 2008/0201321 A1 * | 8/2008 | Fitzpatrick et al. | 707/5 |
| 2009/0094517 A1 * | 4/2009 | Brody et al. | 715/706 |
| 2010/0131355 A1 * | 5/2010 | Kitchen et al. | 705/14.43 |

OTHER PUBLICATIONS

Office Action dated Apr. 28, 2011 for corresponding U.S. Appl. No. 12/325,453.

* cited by examiner

*Primary Examiner* — Jamie Kucab
(74) *Attorney, Agent, or Firm* — William Schiesser; Roberts Mlotkowski Safran & Cole, P.C.

(57) ABSTRACT

A system and method for researching virtual markets and using the research to optimize product placements and displays. The system includes a monitoring engine configured to monitor information about user reactions and/or at least one product. The system also includes a recommendation engine configured to recommend a location within a virtual universe to display the at least one product based on the information monitored by the monitoring engine and a display engine configured to display the at least one product at a recommended location.

11 Claims, 5 Drawing Sheets

Example: Phone #57

| Inputs | Example Aggregated Data | Weighting |
|---|---|---|
| User placed location | 90% eye-level, right side; 10% top right | 10 |
| User interaction with product | 95%, > 1 min, 5% < 30 sec | 9 |
| User tags | 75% prefer chrome; 25% prefer black | 2 |
| Preferred proximity to other items | 60%, next to cellular phones; 40% next to cellular phone accessories | 5 |
| Popularity of similar items | 70% next to personal digital assistants (PDAs); 30% next to cellular phones | 4 |

Weights: 1 – 10, 10 is highest
New Location = Eye-level on right, between PDAs and cellular phones
Additional product insight: Chrome is top color preference.

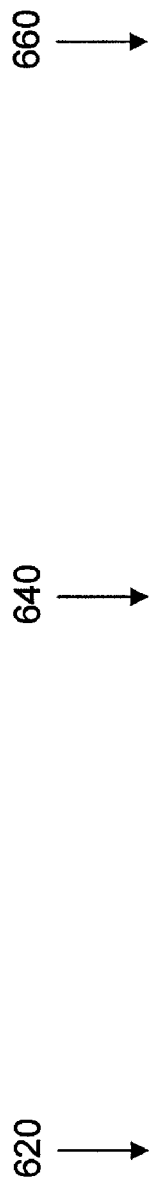

FIG. 6

Example: Phone #57

| Inputs | Example Aggregated Data | Weighting |
|---|---|---|
| User placed location | 90% eye-level, right side; 10% top right | 10 |
| User interaction with product | 95%, > 1 min, 5% < 30 sec | 9 |
| User tags | 75% prefer chrome; 25% prefer black | 2 |
| Preferred proximity to other items | 60%, next to cellular phones; 40% next to cellular phone accessories | 5 |
| Popularity of similar items | 70% next to personal digital assistants (PDAs); 30% next to cellular phones | 4 |

Weights: 1 – 10, 10 is highest
New Location = Eye-level on right, between PDAs and cellular phones
Additional product insight: Chrome is top color preference.

SYSTEM AND METHOD FOR RESEARCHING VIRTUAL MARKETS AND OPTIMIZING PRODUCT PLACEMENTS AND DISPLAYS

FIELD OF THE INVENTION

The invention generally relates to a system and method for researching virtual markets and, in particular, to using virtual market research to optimize product placements and displays within a virtual universe or the real world.

BACKGROUND OF THE INVENTION

A virtual universe (VU) is an interactive simulated environment accessed by multiple users through an online interface. Users inhabit and interact in the VU via avatars, which are a user's representation of himself or herself. These representations can be in the form of a three-dimensional model, a two-dimensional icon, a text construct, a user screen name, etc. Although there are many different types of VUs, there are several features many VUs generally have in common. These features include, for example,

- Shared Space: the VU allows many users to participate at once;
- Graphical User Interface: the VU depicts space visually, ranging in style from 2D "cartoon" imagery to more immersive 3D environments;
- Immediacy: interaction takes place in real time;
- Interactivity: the VU allows users to alter, develop, build, or submit customized content;
- Persistence: the VU's existence continues regardless of whether individual users are logged in; and
- Socialization/Community: the VU allows and encourages the formation of social groups such as teams, guilds, clubs, cliques, housemates, neighborhoods, etc.

With the emergence of VUs, businesses must now develop new marketing strategies to reach and effectively sell products to users participating in VUs. Traditionally, businesses have relied on focus groups, surveys, and/or sales campaigns to ascertain consumer trends and develop marketing strategies based on the acquired information. However, these methods often prove to be costly, time consuming, and at times ineffective. Understandably, traditional marketing methods cannot keep up with emerging technologies.

For example, using traditional marketing methods, one or more consumers may be asked to fill out a survey on what products the consumer likes best in a store and/or what products the user would like to see removed. Based on this survey, businesses can determine what products are most popular amongst consumers and use this information to rearrange products within a store so that the most popular products can be easily accessed by consumers. This may be done, e.g., by placing popular products at the front of a store so as to attract consumers walking by and/or allow consumers to quickly choose products once in a store. However, from start to finish, the process of gathering information, analyzing the information, sending the information to key persons, making changes within a store based on the information, etc., can be very time consuming and expensive. Moreover, the information is frequently outdated before any changes can even be made.

SUMMARY OF THE INVENTION

In a first aspect of the invention, a system comprises a monitoring engine configured to monitor information about user reactions and/or at least one product. The system further comprises a recommendation engine configured to recommend a location within a virtual universe to display the at least one product based on the information monitored by the monitoring engine. The system also comprises a display engine configured to display the at least one product at a recommended location.

In another aspect of the invention, the method comprises monitoring one or more user reactions or interactions with a product or display by one or more users in a virtual universe and aggregating the one or more user reactions or interactions. The method also comprises recommending a location to place the product or display based on the aggregated one or more user reactions or interactions and displaying the product or display at the recommended location.

In another aspect of the invention, a computer program product comprising a computer usable medium having readable program code embodied in the medium is provided. The computer program product includes at least one component to: aggregate one or more user actions related to a product within a virtual universe; recommend a location for the product based on the aggregated one or more user actions; and display the product at the recommended location.

In another aspect of the invention, a method for deploying an application for placing products in a virtual universe, comprises: providing a computer infrastructure being operable to: gather information ascertained about an interaction between at least one user and a product or display in a virtual universe; recommend at least one location to display the product or the display based on the saved information; and display the product or the display at the at least one location.

BRIEF DESCRIPTION OF THE DRAWINGS

The present invention is described in the detailed description which follows, in reference to the noted plurality of drawings by way of non-limiting examples of exemplary embodiments of the present invention.

FIG. 6 shows an example of the Recommendation Engine in accordance with embodiments of the present invention.

DETAILED DESCRIPTION OF THE INVENTION

The invention is directed to a system and method for researching virtual markets and using the research to optimize product placements and displays. In particular, the present invention allows one or more users to interact with products in a virtual location, such as a virtual store, kiosk, etc., and obtain information about the users interactions and reactions to products and displays. For example, users can interact with products by rearranging products within a virtual store, opining and/or reviewing products using a tag, comparing products to one another, etc. All of these movements and/or opinions, as well as consumer reactions and/or responses to product displays within a VU, can be monitored and saved using the current invention. This saved information can then be analyzed and used to recommend locations, which optimize product placements and displays.

Additional information, such as special product sales, current coupons and/or advertising campaigns, etc., can also be monitored and saved using the current invention. This information can then be aggregated or used individually to determine how popular a product is and/or ascertain preferred product placements. Once aggregated, the information can be offered as a service to location owners, business analysts, and/or marketing analysts, etc., to develop product placement and development plans within one or more virtual locations. The information may also be used to dynamically optimize product placements and displays within a VU.

In addition to optimizing product placements and displays in a VU, the present invention can also be used to optimize product placements and displays in the real world. For example, product display information may be gathered in a VU and sold to real world businesses. Real world businesses can use this information to update their real world product displays to reflect consumer behavior, preferences, and/or trends, as observed in a VU. Since this information is directly related to consumer actions, this information more accurately reflects current consumer preferences and product popularity than traditional methods. Moreover, once monitored and stored, this information can beneficially be accessed, analyzed, and transmitted to real world businesses at a fraction of the time and cost of existing methods. Accordingly, the present invention provides a fast, up-to-date, and convenient research tool for optimizing product placements and displays within a VU and the real world.

System Environment

Figure 1:
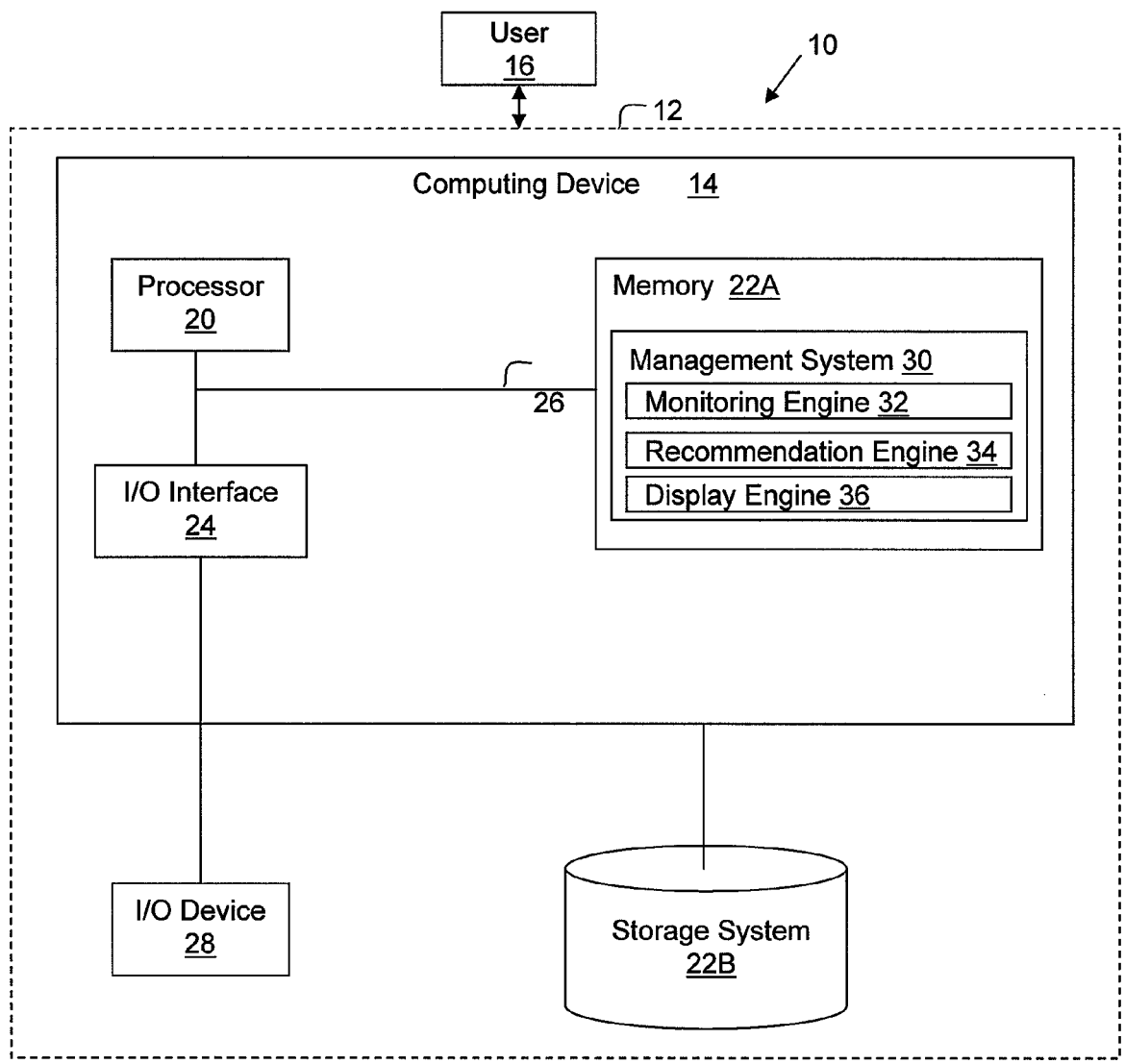
FIG. 1 shows an illustrative environment for implementing the steps in accordance with the invention.

FIG. 1 shows an illustrative environment 10 for managing the processes in accordance with the invention. To this extent, the environment 10 includes a server 12 that can perform the processes described herein. In particular, the server 12 includes a computing device 14, which may be in the form of a VU server system. The computing device 14 comprises a Management System 30, which may be embodied as a VU and stored in memory 22A. The Management System 30 may include a Monitoring Engine 32, a Recommendation Engine 34, and a Display Engine 36.

More specifically, the Monitoring Engine 32 can be configured to make computing device 14 operable to monitor reactions, responses, opinions, and/or movements, etc., made by a user 16 while participating in a VU. In particular, the Monitoring Engine 32 can be used to monitor one or more users 16 at the same time. For example, the Monitoring Engine 32 can monitor users 16 that are participating in a promotion, hired shoppers, and/or are otherwise compensated shoppers. The Monitoring Engine 32 may also monitor normal users 16, which are participating in the VU. In embodiments, the Monitoring Engine 32 may monitor all users 16 within a virtual location and/or allow users 16 to opt-out of being monitored and/or opt-in to being monitored.

A number of interactions and reactions can be monitored by the Monitoring Engine 32. For example, the Monitoring Engine 32 can be used to monitor whether a user touches or otherwise interacts with a product, how long the interaction lasts, how frequently the interaction occurs, what products are compared side-by-side, etc. The Monitoring Engine 32 can also be used to allow a user 16 to express an opinion about a product by adding one or more tags to a product. For example, a user 16 could add a tag to a product commenting on the color of the product, quality and/or or price of the product, etc. Tags, which may include information associated with a user 16 and/or product, can also be dynamically created by a VU when, e.g., a user 16 touches and/or interacts with a product.

The Monitoring Engine 32 may also be used to monitor avatar emotions, facial expressions, what products an avatar looks at, etc. For example, the Monitoring Engine 32 can be used to determine whether an avatar is smiling and the product the avatar is looking at while smiling. The Monitoring Engine 32 can interpret this facial expression as a favorable response or a negative response. This interpretation may be made using one or more pre-established rules or by allowing product owners to indicate what emotions, facial expressions, etc., are favorable for a product. For example, if a product owner indicates that a product is designed to make users laugh then a user laughing at a product can be monitored by the Monitoring Engine 32 as a favorable expression. However, if a product is designed to be serious then a user laughing at the product can be monitored by the Monitoring Engine 32 as a negative expression.

The Monitoring Engine 32 is further configured to determine whether a user 16 has authority to rearrange products throughout a virtual location. If a user 16 has authority, the user 16 can move products to different locations on a display shelf, which may be represented via a grid. For example, a user may have authority to rearrange a virtual location by placing products that the user likes at the front of the virtual location and other products at the back of the virtual location or in the corner of the virtual location. Embodiments may also permit users 16 to remove products from being displayed while the user is in the virtual location. For example, a user 16 at a virtual computer store may remove all computer products that will not run on the user's computer.

Changes made by a user 16 to a product display may be displayed to the user 16 while the user 16 is at the virtual location. In embodiments these changes may be remembered and displayed to the user 16 each time the user 16 reenters the virtual location. However, alternative embodiments may not remember changes once the user 16 leaves the virtual location or once the user 16 is no longer within a certain proximity of the virtual location.

The Monitoring Engine 32 can save information relating to the monitored reactions, responses, opinions, movements, arrangements, etc., using a storage system 22B. This stored information can be aggregated to determine what products receive attention from users 16 participating in a VU. Optionally, embodiments may also utilize individual pieces of information, such as, for example, information obtained from virtual celebrities or consultants. The information obtained from the Monitoring Engine 32 can be used to determine, e.g., where users 16 place products and make recommendations on how to arrange product displays to attract customers and sell products. These recommendations may be made by the Recommendation Engine 34.

The Recommendation Engine 34 is configured to make computing device 14 operable to recommend a location to display one or more products. The Recommendation Engine 34 can make these recommendations by obtaining aggregated and/or individual pieces of information obtained from the Monitoring Engine 32 and stored in a storage system 22B. This information may be obtained each time a change has been made to a product and/or periodically. Once the aggregated information is obtained from the storage system 22B, one or more weighing algorithms can be applied to the information to determine where the one or more products should be displayed. For example, in embodiments, a pairwise comparison and/or a hierarchical method can be used to weigh one or more locations. The recommendations from the Recommendation Engine 34 may then be displayed by the Display Engine 34.

The Display Engine 36 is configured to make computing device 14 operable to display products within a VU. In particular, the Display Engine 36 is configured to display one or more products before and/or after they have been arranged by a user 16. The Display Engine 36 may also be used to display particular information about a product. For example, if a user 16 is in a virtual computer store, the Display Engine 36 may be used to provide the user 16 with information about the system requirements for a piece of software being sold in the virtual computer store. Embodiments may also use the Display Engine 36 to create a graphical representation of a store, which may include one or more recommended product or display locations. This graphical representation can be relayed to one or more real world vendors who can implement the graphical representation to optimize product placements and displays in the real world.

The Display Engine 36 can be further configured to dynamically display products within a VU based on current available information. For example, the Monitoring Engine 32 can immediately or periodically analyze user reactions, responses, opinions, and/or movements, etc. Once analyzed, the recommendations from the Recommendation Engine 34 can be sent to the Display Engine 36, which can dynamically change product displays throughout the virtual location.

Embodiments may dynamically change product displays for all users within a location. However, it should be understood that embodiments may refrain from dynamically making changes while the user 16 is at a virtual location to avoid confusing the user 16. For example, in embodiments a product display may not be altered while a user 16 is looking at the display. This beneficially allows users 16 that are looking at a product display to continue to look at the same product display even after the display has been dynamically changed for other users 16. Embodiments may also refrain from dynamically and/or periodically changing a display while a user is at a virtual location. This allows a single product display to be presented to users for the entire duration the user is at a virtual location, while users entering the virtual location may be presented with an updated product display.

While the Management System 30 includes multiple engines, it should be understood by those skilled in the art that additional engines may also be included in the Management System 30. For example, an engine may be included to determine whether a user has authority to rearrange products within a virtual location. Additionally, a remuneration engine may be included to remunerate one or more users for offering opinions about a product, rearranging one or more products, etc. This remuneration may be monetary, reward based, and/or in the form of free or discounted products, etc. Embodiments may also include a billing engine in the Management System 30, which is configured to charge a vendor for any and/or all of the aggregated information stored in the storage system 22B. The billing engine may also be used to charge vendors for product display locations within the virtual location. For example, the billing engine may charge a vendor more for displaying a product on the end of an aisle near a walkway, whereas, embodiments may charge vendors less for displaying a product on the top of a shelf at the back of a virtual store.

The computing device 14 includes a processor 20, the memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. For example, the memory can provide local memory employed during execution of the program codes for engines 32, 34, 38, and 36.

Further, the computing device 14 is in communication with an external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, etc.

In general, the processor 20 executes computer program code, which is stored in the memory 22A and/or storage system 22B. While executing computer program code, the processor 20 can read and/or write data to/from memory 22A, the storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Exemplary Implementation of the System

FIGS. 2-5 are flow diagrams implementing steps of the invention, which may be implemented in the environment of FIG. 1. FIGS. 2-5 may equally represent a high-level block diagram of the invention. The steps of FIGS. 2-5 may be implemented and executed from either a server, in a client server relationship, or they may run on a user workstation (any of which can be generally represented in FIG. 1) with operative information conveyed to the user workstation to allow information to be presented to a user during content breakpoints. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1, as should be understood and capable of implementation by those of skill in the art. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

More specifically, FIGS. 2-5 are exemplary embodiments wherein a customer interacts with products at a virtual store, kiosk, location, etc. More specifically, FIGS. 2-5 illustrate possible features available to users having different statuses and how information saved about the users' interactions can be saved and further utilized by VU vendors and/or real world vendors. The type of interactions available to the user may depend on the user's status. For example, a user that has been hired to shop at a virtual store may be given the ability to interact with products in different ways than a normal user coming into a store to shop. Additionally, repeat, valued, and or promotional users may be given more or fewer abilities to interact with products than normal users and/or hired shoppers.

Figure 2:
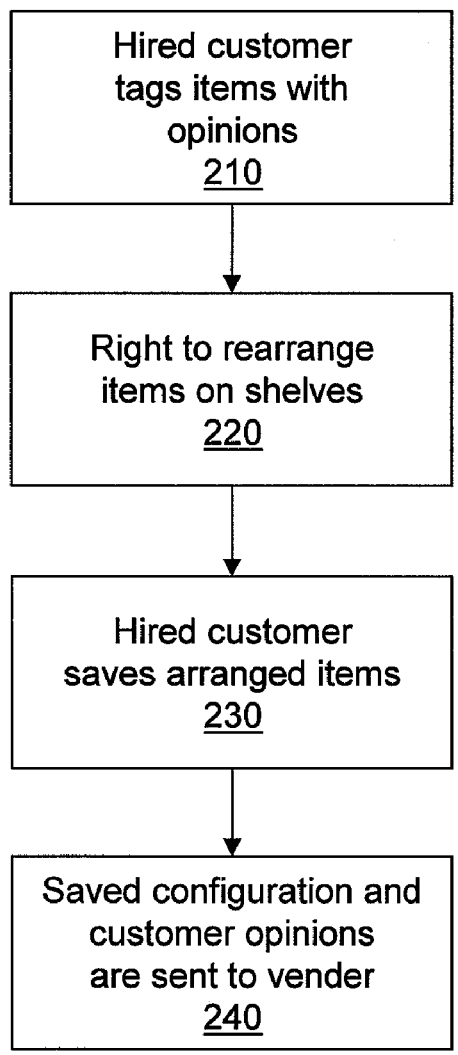
FIGS. 2-4 are flow charts of exemplary processes according to aspects of the invention.

FIG. 2 illustrates an exemplary embodiment wherein a hired shopper is given the ability to tag one or more products with opinions about a product, at step 210. Embodiments may also allow the hired shopper to rearrange products on one or more display shelves within a virtual location, at step 220. The rearrangement is reflective of what products the hired shopper would like to see when, e.g., looking at the top, bottom, middle, and/or sides of a product display. Once rearranged, the hired shopper can save the arranged products and/or opinions, at step 230. This saving process may be performed automatically and/or may be performed affirmatively by the user. The saved information can then be sent and/or sold to a vendor, at step 240, via a service provider.

Figure 3:
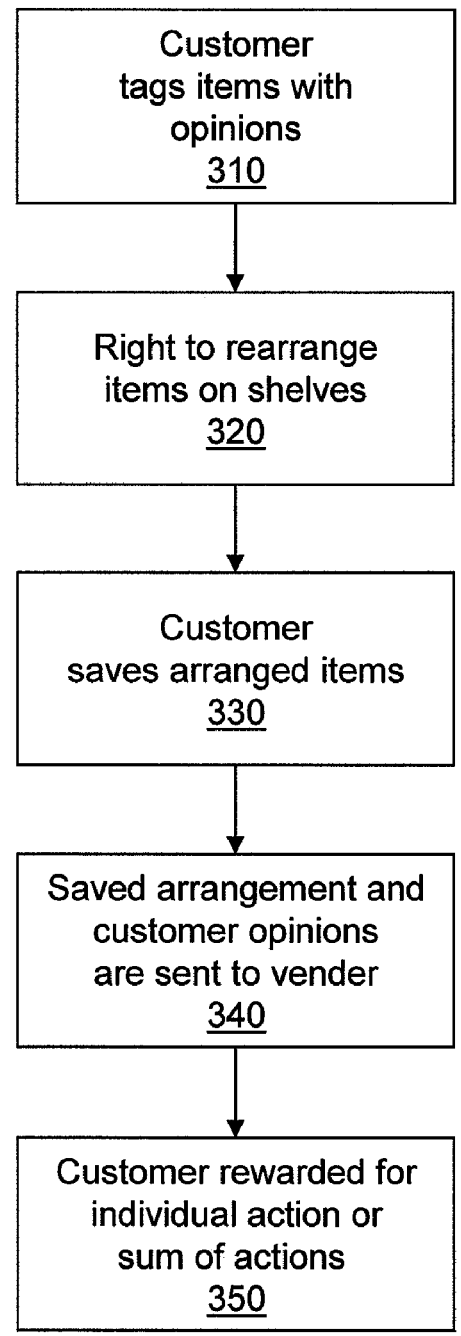

FIG. 3 illustrates an exemplary embodiment wherein a normal shopper is given the ability to tag one or more products with opinions about a product, at step 310. The normal shopper may also rearrange products on display shelves, at step 320. These rearrangements and tags may be saved, at step 330, via a service provider. The saved information can then be sent and/or sold to a vendor, at step 340, via a service provider. The normal shopper may be rewarded for rearranging and/or adding tags to one or more products, at step 350. This reward may be in the form of discounted products, rewards, and/or monetary compensation, etc.

Figure 4:
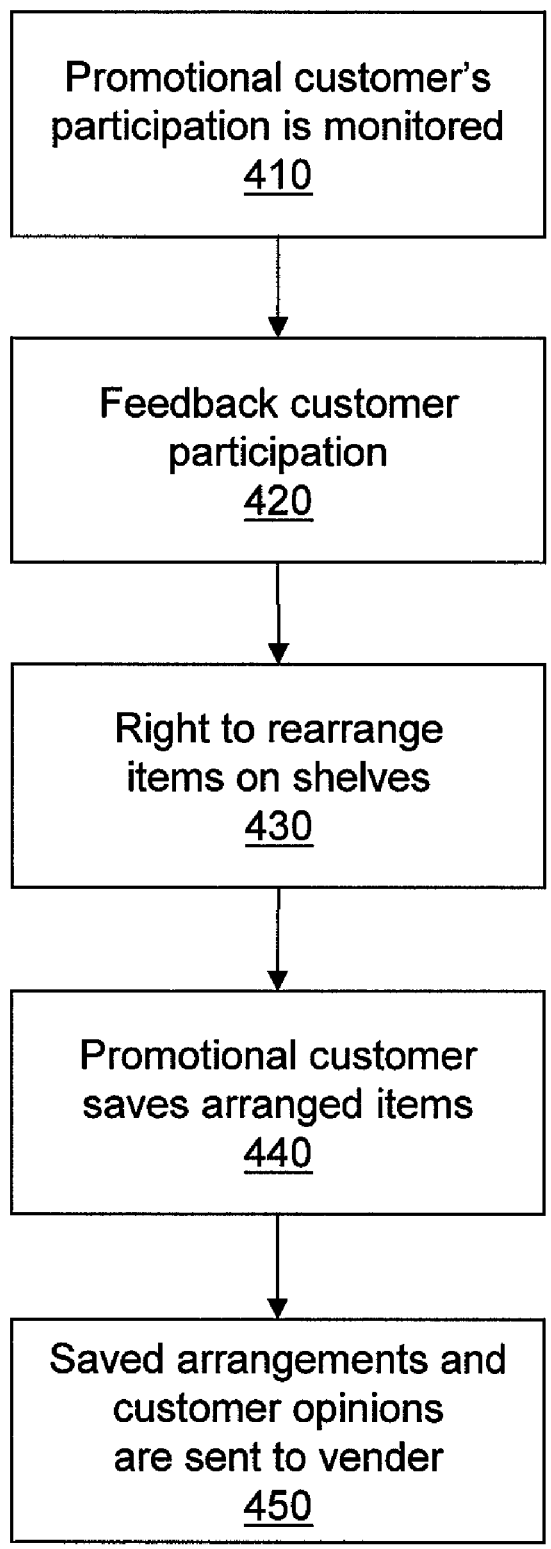

FIG. 4 illustrates an exemplary embodiment wherein promotional shoppers are encouraged to participate in a VU and their participation is monitored, e.g., by the Monitoring Engine, at step 410. Types of participation that may be monitored include, for example, the shopper's reactions, responses, opinions, and/or movements, etc., in relation to one or more products. This information can then be aggregated and/or sent individually as shopper feedback, at step 420. While participating in the VU, promotional shoppers may be permitted to rearrange products on display shelves, at step 430. These arrangements can be saved by the shopper, at step 440. Once saved, the information can be sent and/or sold to a vendor, at step 450, via a service provider.

It should be understood by those skilled in the art that FIGS. 2-4 are merely illustrative and more or fewer flow steps may be available to one or more users based on a user's status and/or regardless of a user's status. For example, embodiments may include a step that limits and/or prohibits specific users and/or groups of users from rearranging products at a virtual location. Embodiments may also include a step that allows specific users and/or groups of users to rearrange products within a virtual location but not save the changes. Further embodiments may include steps for weighing user reactions, responses, opinions, and/or movements, etc., based on a user's status.

Recommendation Engine

Figure 5:
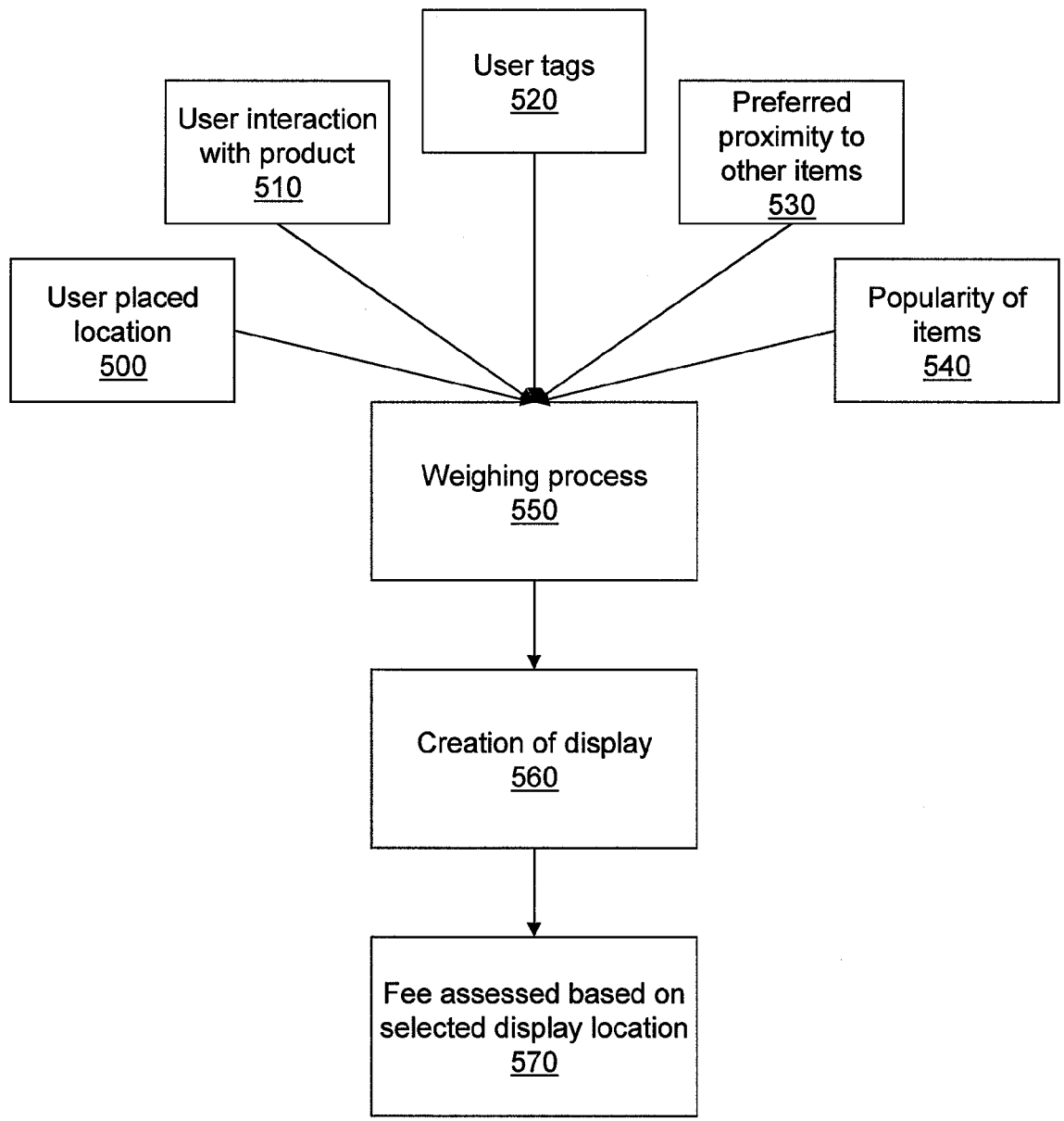
FIG. 5 shows a flow diagram for implementing the Recommendation Engine according to aspects of the invention.

FIG. 5 illustrates a flow diagram having steps for implementing the Recommendation Engine in accordance with aspects of the present invention. In particular, FIG. 5 illustrates multiple user inputs that can be obtained from the Monitoring Engine and recorded using a storage system. For example, the Recommendation Engine can obtain information from the Monitoring Engine regarding: where one or more users place products; how users interact with a product; user opinions and/or comments about a product; how proximate a user places a product to other products; and/or the popularity of similar products (e.g., how often it is touched, looked at, etc.); etc. Any or all of this information can be recorded, aggregated, and/or weighed by the Recommendation Engine. Once weighed, the Recommendation Engine can recommend a product display, which can be created via the Display Engine.

Referring to FIG. 5, the Recommendation Engine may receive information about where one or more users place products within a virtual location, at step 500. These user placements and/or rearrangements can be aggregated and saved in a storage system, such as storage unit 22B. The information received from the user product placements can be weighed by a weighing process, at step 550.

The Recommendation Engine may also receive information about how one or more users interact with a product, at step 510. This information may include, for example, how much time a user interacts with one or more products. The information may also include whether the user: compares one or more products together; carries a product around a store; shows the product to another user; etc. Information received from the Monitoring Engine about user interactions with products can be weighed by a weighing process, at step 550.

Information received from user tags may also be utilized by the Recommendation Engine, at step 520. The type of information in the user tags may vary between embodiments and include, for example, comments, opinions, preferences, etc. The information obtained from the user tags can be merged and used to analyze collective market reactions to products, vendors, advertisers, etc. The information received from user tags can also be weighed by a weighing process, at step 550.

The Recommendation Engine can receive information from the Monitoring Engine as to a preferred proximity of a product to other products, at step 530. The preferred proximity may be used by the Recommendation Engine to place similar or complimentary products proximate to one another, thereby giving the user a sense of order while shopping in a virtual location. The information received about preferred proximities can be weighed by a weighing process, at step 550.

The popularity of one or more products may be used by the Recommendation Engine to determine where to place a product, at step 540. For example, if a product is similar to a popular product then the Recommendation Engine may recommend a preferred location near the popular product. This information about preferred proximities can be weighed by a weighing process, at step 550.

At step 550, the Recommendation Engine utilizes a weighing process to weigh information received from one or more of steps 500, 510, 520, 530, and/or 540. The weighing process is configured to apply a weight to one or more inputs received from the Monitoring Engine. These weights may be assigned by the VU, location owner, product vendor, user, etc. One or more different weights may be applied depending on the product, user providing the input, and/or the group of users providing the input. The weighing process is configured to compare the weighted information using any number of known methods for comparing information, such as pairwise comparisons, hierarchical methods, etc.

Once information has been weighed and compared a product display can be created, at step 560. The product display can be created by the Display Engine according to the recommendations made by the Recommendation Engine. The product display may be automatically generated or generated upon obtaining approval from one or more of the location owner, VU, administrator, etc. Embodiments may allow the VU, location owner, administrator, etc., to alter one or more of the recommended product placements prior to presenting the product display to one or more user.

Once a product display is created, embodiments may assess a fee to a product vendor and/or location owner, at step 570. For example, the present invention may assess a fee to product vendors based on the location of the product within a product display. Thus, a vendor displaying a product at a prime location may be charged more than a vendor displaying a product at a sub-prime location. Alternatively, embodiments may charge all vendors the same amount for displaying products in a product display. Furthermore, in embodiments the location owner may be charged a fee for the aggregated information and/or the creation of a product display. This fee may be a flat fee paid for a period of time or based on how many times aggregated information is accessed and/or product displays are created. The fee assessment may be performed by the Recommendation Engine, Display Engine, and/or a billing engine. In embodiments, all or part of the fee may be given to a service provider for analyzing and providing information to the VU. Embodiments may also charge a fee, which may be payable to the VU, for changing product placements within the VU.

FIG. 6 shows an example of the Recommendation Engine in accordance with embodiments of the present invention. More specifically, FIG. 6 includes a number of inputs, at column 620. These inputs can include, for example: where one or more users place products; how a user interacts with products; user opinions and/or comments about a product; how proximate a user places a product with respect to other products; and/or the popularity of similar products; etc.

FIG. 6 also includes exemplary aggregated information, at column 640. This information can be presented as raw information and/or statistical calculations, which can be performed by the Recommendation Engine or another computing engine. The aggregated information can be presented to location owners, product vendors, etc., thereby allowing them to view product and/or user trends. For example, a location owner viewing aggregated information on Phone #57 can determine that 90% of users place Phone #57 at eye level on the right side of a product display, while 10% of users place Phone #57 on the top right portion of the product display.

A weight may be assigned to each input, at column 660. These weights may be assigned by one or more users, location owners, and/or product vendors, etc. The assigned weights indicate the importance of one or more inputs, hence, a high weight may indicate that the input is important whereas a low weight may be indicate that the input is not as important. However, the inverse may also apply.

In addition to applying weights to products, as depicted in FIG. 6, weights may also be applied to a user and/or group of users. For example, if a virtual location caters to a target demographic then inputs obtained from a user within the target demographic may be weighted higher than inputs from a user in another demographic.

Once information from the inputs is aggregated and weighted, one or more locations for product display positioning can be recommended by the Recommendation Engine. For example, based on the aggregated information, the Recommendation Engine may recommend that Phone #57 be placed at eye-level on the right side of a display between personal digital assistants (PDAs) and cell phones. The Recommendation Engine may also be used to provide additional insight into the product display and relay the insight to location owners, product vendors, and/or one or more users. For example, the Recommendation Engine may provide location owners, product vendors, etc., with information obtained from the inputs, such as, e.g., the top color preference for Phone #57 and or the popularity of similar products.

Accordingly, by utilizing the Recommendation Engine location owners, product vendors, etc., can be autonomic and control all aspects of a virtual location. This may include, e.g., what products to stock, where to place products, how much to charge vendor for display space, etc. Additionally, since recommendations are performed in real-time, locations owners, product vendors, etc., can obtain immediate customer feedback on one or more products within a virtual location.

Additional Embodiment

It should be understood that the present invention can also be applied in the real world. For example, using the information gleaned in the VU, a vendor can rearrange product placements in a brick and mortar store. This beneficially allows real world location owners to obtain a comprehensive profile of their customers, which may be impractical and/or impossible to obtain without the present invention. Additionally, the present invention permits information to be obtained from a large pool of users instead of small focus groups and also avoids researcher bias, which may occur, e.g., using real world surveying methods.

While the invention has been described in terms of embodiments, those skilled in the art will recognize that the invention can be practiced with modifications and in the spirit and scope of the appended claims. Additionally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented on a computing infrastructure for displaying products comprising:
   monitoring one or more user reactions or interactions with a product or display by one or more users in a virtual universe using one or more processors;
   aggregating the one or more user reactions or interactions using the one or more processors;
   recommending a location in the virtual universe to place the product or display based on the aggregated one or more user reactions or interactions using the one or more processors;
   displaying the product or display at the recommended location;
   determining a user status using the one or more processors;
   monitoring the one or more user reactions or interactions, which include at least one of: where the user places one or more of the at least one product; how the user interacts with the at least one product; the user's opinions and/or comments about the at least one product; how proximate the user places the at least one product to other products; and popularity of similar products using the one or more processors;
   assigning a weight to each of the user reactions or interactions;
   weighing the user reactions or interactions using the one or more processors;
   recommending the location based on the weighing and the aggregated one or more user reactions or interactions using the one or more processors; and
   assessing a fee for the displaying.

2. The method of claim 1, further comprising dynamically changing a product display based on the one or more user reactions or interactions.

3. The method of claim 1, wherein the aggregated one or more user reactions or interactions are sold to at least one vendor in the real world.

4. The method of claim 1, wherein the steps of claim 8 are offered by a service provider based on one of a fee and subscription basis.

5. The method of claim 1, wherein the steps of claim 8 are provided on a computer infrastructure, which is at least one of supported, deployed, maintained, and created by a service provider.

6. A computer program product comprising a computer usable storage medium having readable program code embodied in the storage medium, programmed to:
   aggregate one or more user actions related to a product within a virtual universe;
   recommend a location in the virtual universe for the product based on the aggregated one or more user actions;
   display the product at the recommended location;
   ascertain a user status, which includes one or more of a hired user, a normal user, and a promotional user;
   monitor the one or more user actions, which include at least one of a user reaction, a user response, a user opinion, and a user or product movement;
   aggregate and present the one or more user actions to at least one of a product vendor or a location owner;
   send the monitored one or more user actions to a recommendation engine;
   weigh the monitored one or more user actions using a weight assigned by at least one of the user, the product vendor, or the location owner;
   recommend a location based on the weighing; and
   assess a fee for the display.

7. The computer program product of claim 6, wherein the one or more user actions include one or more of a user reaction, user response, user opinion, and user or product movement.

8. The computer program product of claim 6, wherein the recommendation is based on weighing one or more of: where a user places the product; how the user interacts with the product; the user's opinions and/or comments about the product; how proximate the user places the product to another product; and popularity of similar products.

9. The computer program product of claim 6, wherein the product is dynamically displayed at the recommended location.

10. The computer program product of claim 6, wherein the recommended location is sold to a virtual vendor and/or a real world vendor.

11. The computer program product of claim 6, wherein the computer program product is at least one of supported, deployed, maintained, and created by a service provider.

* * * * *